Aug. 26, 1924.　　　　　1,506,477
F. A. A. ESSMANN
WEIGHING SCALE
Filed March 21, 1923　　6 Sheets-Sheet 1

Inventor
F.A.A. Essmann
by Langner, Parry, Card & Langner
Attys

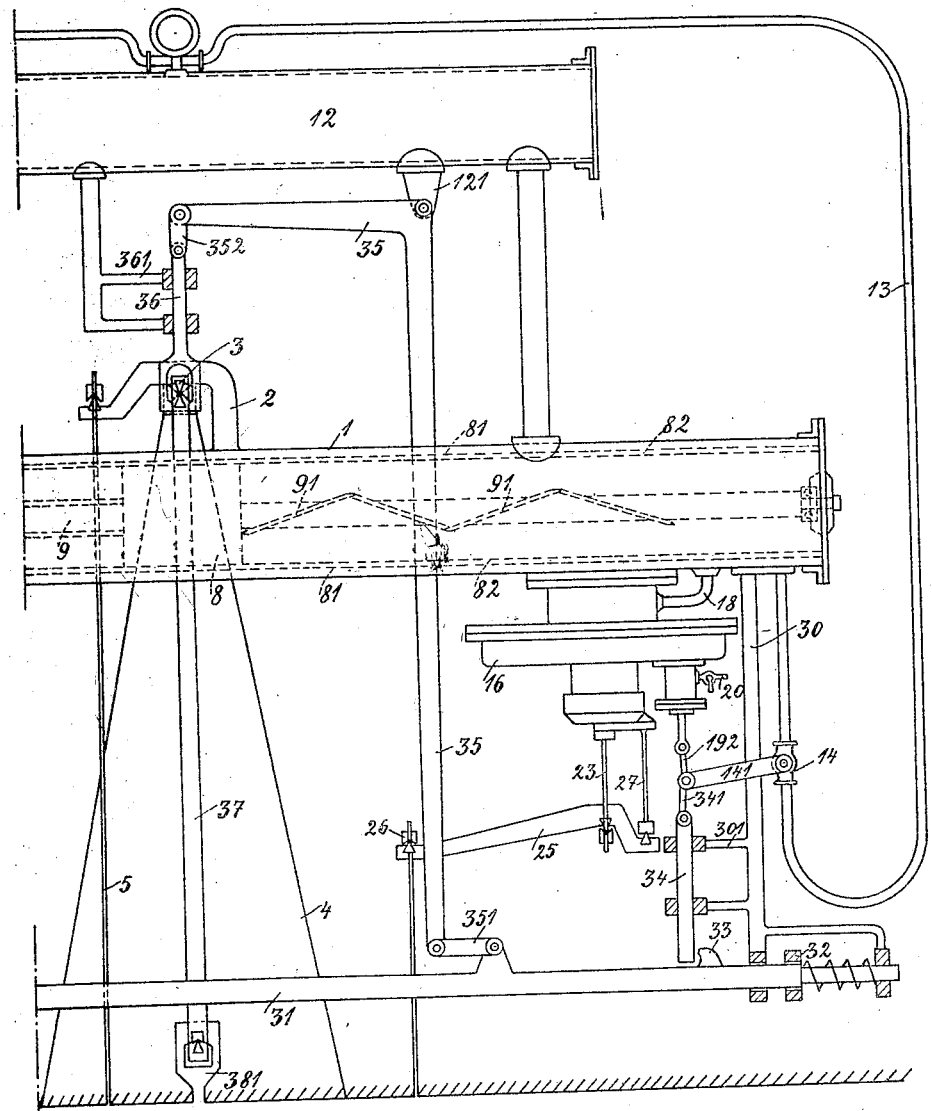

Aug. 26, 1924.  
F. A. A. ESSMANN  
WEIGHING SCALE  
Filed March 21, 1923
1,506,477
6 Sheets-Sheet 3

Inventor  
F.A.A. Essmann

Aug. 26, 1924.

F. A. A. ESSMANN

WEIGHING SCALE

Filed March 21, 1923  6 Sheets-Sheet 4

1,506,477

Inventor
F.A.A. Essmann
by Langner, Parry, Card Langner
Attys

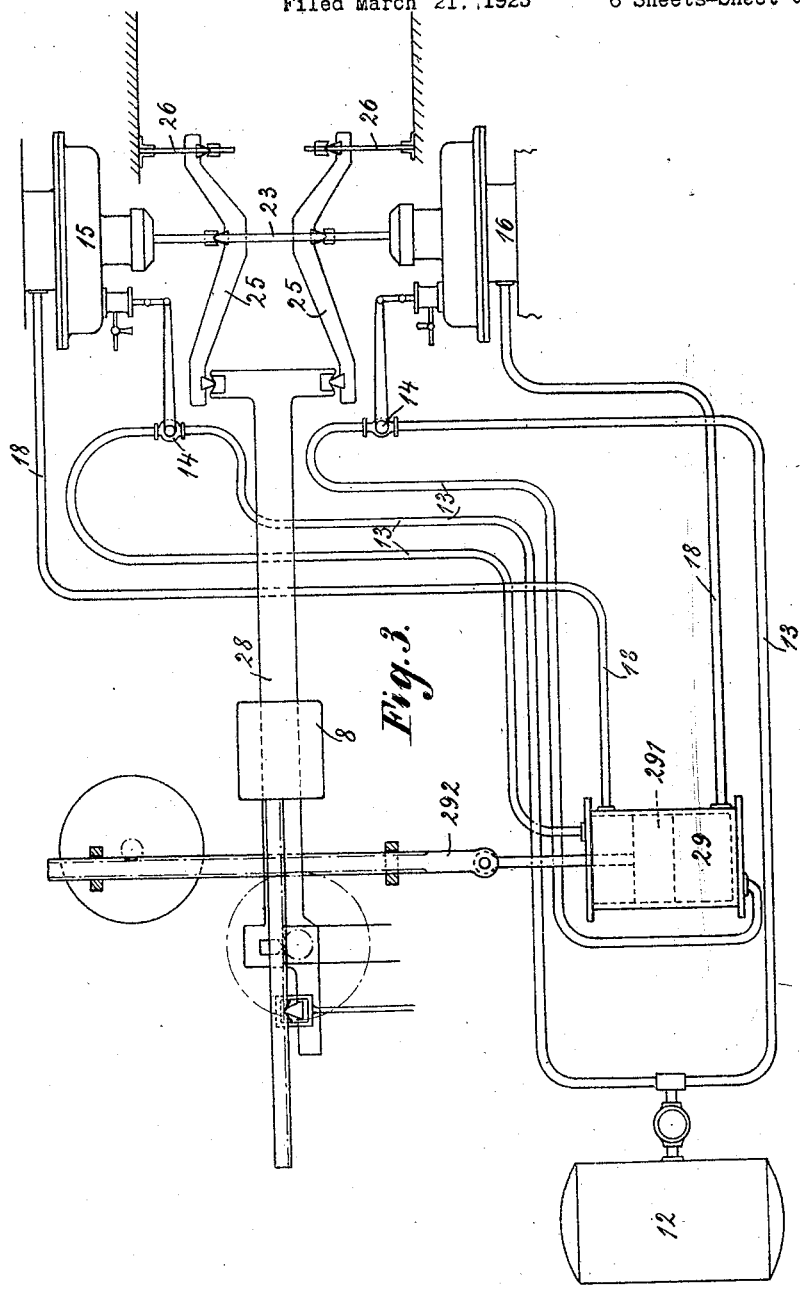

Aug. 26, 1924.
F. A. A. ESSMANN
WEIGHING SCALE
Filed March 21, 1923    6 Sheets-Sheet 6
1,506,477
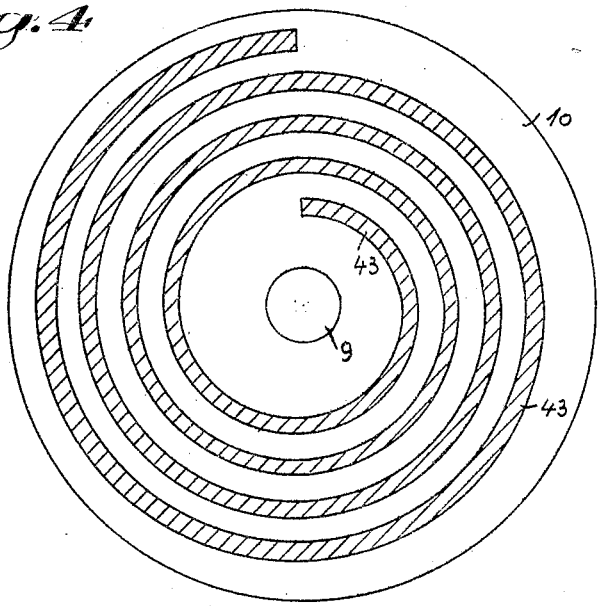
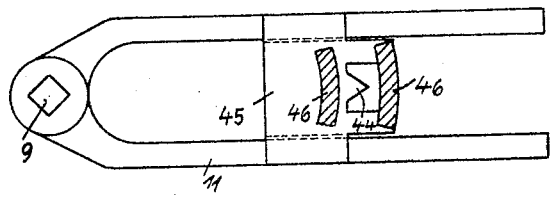
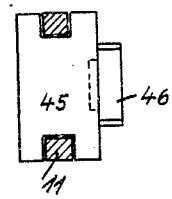
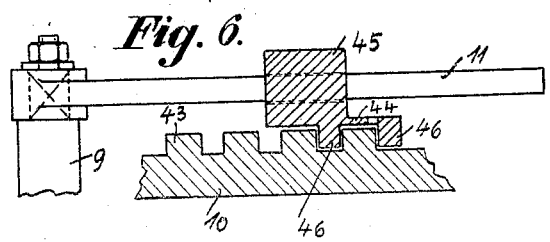
Inventor
F.A.A. Essmann
by Langner, Parry, Card & Langner
Attys

Patented Aug. 26, 1924.

1,506,477

UNITED STATES PATENT OFFICE.

FRIEDRICH AUGUST ALBERT ESSMANN, OF ALTONA-OTHMARSCHEN, GERMANY.

WEIGHING SCALE.

Application filed March 21, 1923. Serial No. 626,682.

*To all whom it may concern:*

Be it known that I, FRIEDRICH AUGUST ALBERT ESSMANN, citizen of Germany, residing at Altona-Othmarschen, Moltkestrasse 71, Germany, have invented certain new and useful Improvements in a Weighing Scale, for which I have filed an application in Germany on March 3, 1922, of which the following is a specification.

The present invention relates to weighing scales, in which the weigh-beam carries a weight that is adjustable longitudinally to the beam. In the present weighing scale the adjustment of the weight or poise is carried out by the aid of compressed air, or other fluid, the main object of the present invention being to construct a device for distributing the compressed fluid, which device is operated by the oscillations of the weigh beam and controls the compressed air in such manner that the weight is moved in one direction or the other corresponding to up- or down-movement of the weigh beam. The distributing device consists of two equal valves for the compressed air of which only that one is allowed to operate on the movement of the weigh beam which, according to the upward or the downward movement of the weigh beam is intended to cause an adjustment of the weight in the necessary direction.

Another important object of the invention is the construction of the weigh beam as a hollow cylinder and the arrangement of the weight or poise within the latter in such manner, that on its movement caused by compressed fluid to one or the other side the shaft of the hand or pointer is rotated to indicate the weight of the goods weighed. When the beam is constructed as a hollow cylinder the two said valves are arranged near the two ends of the cylinder, so that on the oscillation of the beam about the fulcrum in the centre, the valves are raised or lowered respectively. The distributing member (valve spindle) is in connection with a fixed part of the weighing scale in such manner, that always only one of the two valves operates to cause a movement of the weight by the aid of compressed air on the raising or lowering respectively.

In weighing scales, in which the weight is slidable on the outside of the weigh beam, the valve devices are mounted on a fixed part of the scale, and the beam is constructed to act on the distributing member of one valve when moving upwardly, and on the distributing member of the other valve when moving downwardly, so that by the means of that valve, which at the time is acted upon, the piston is moved in the air cylinder in one direction, whereby the adjustment of the weight takes place in the direction necessary for the equilibrium.

The distributing device operates conjointly with a locking device acting upon the relief device for the scale bridge. The latter consists of a rail or the like which is shifted together with a distributing member forming part of the pneumatic, or hydraulic, or electric relief device putting a stop or turning off the relief of the scale, and is locked in the shifted position by a member acting together with the distributing device until the weight is adjusted. In this position the rail locks the distributing member in the position in which the relief is inoperative.

The invention will be described hereinafter with reference to the drawings in which devices are shown by way of example.

Figure 2:
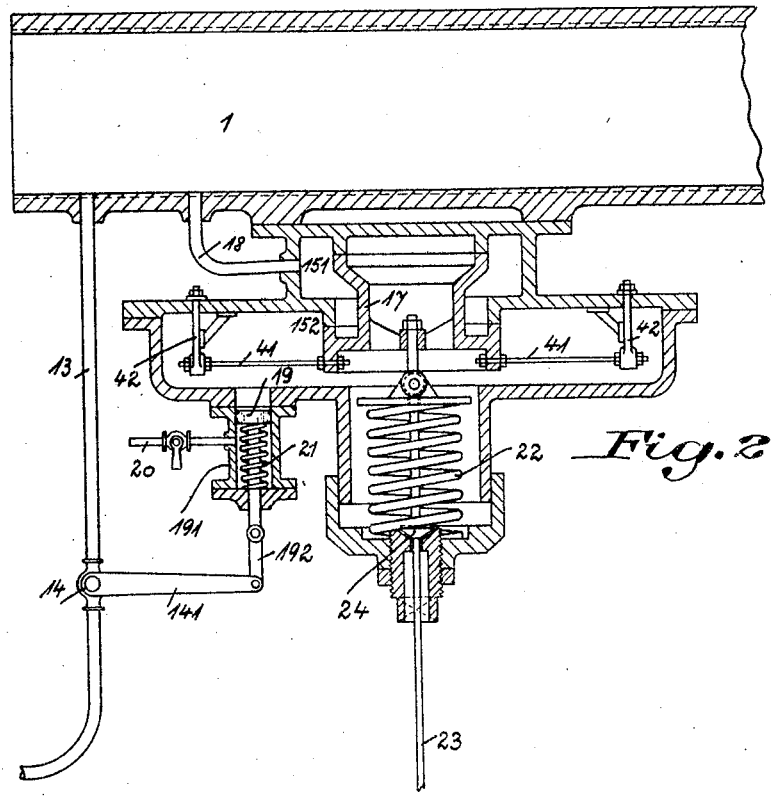
Fig. 2 is a vertical section of a valve device mounted on a hollow cylinder.
Figure 2A:
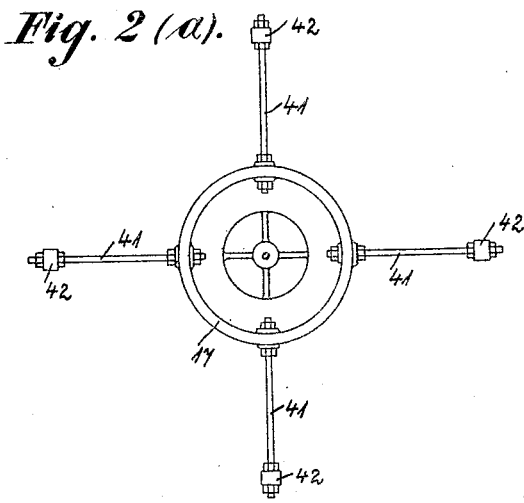

Fig. 2ª shows means to mount the valve proper used within the valve device shown in Fig. 2, and Fig. 3 shows a modification also in diagrammatical illustration.

Fig. 4 shows an end wall of the hollow cylinder for carrying a scale;

Fig. 5 shows a pointer used with the scale.

Fig. 6 is a side view of the pointer, and

Fig. 7 is an end view of the pointer.

Figure 1A:
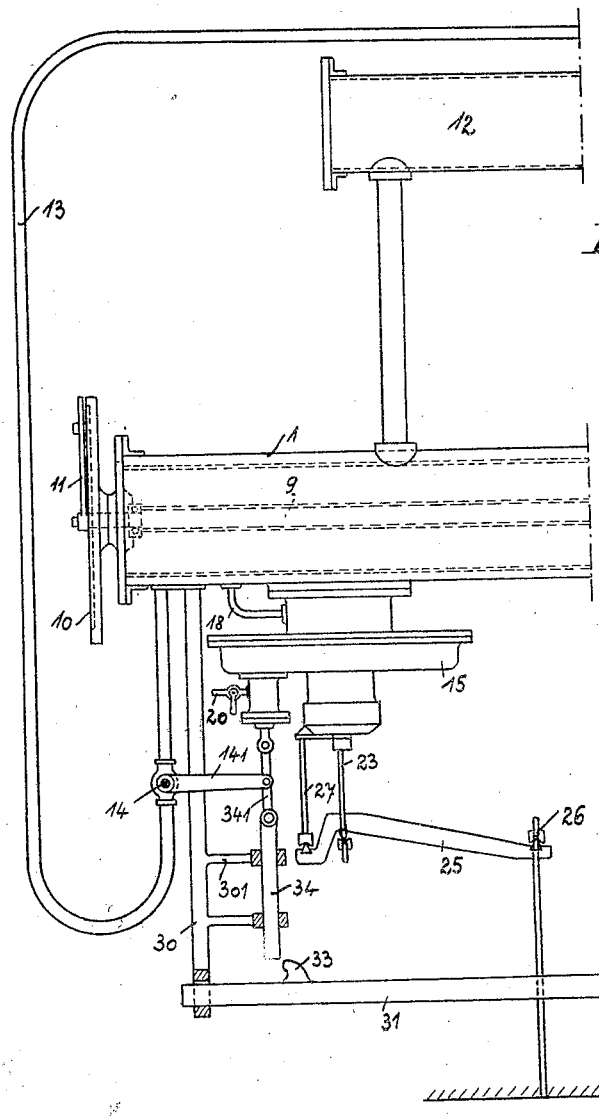
Fig. 1 (*a*, *b* and *c*) is a diagrammatical view of a weighing scale embodying the invention.
Figure 1C:
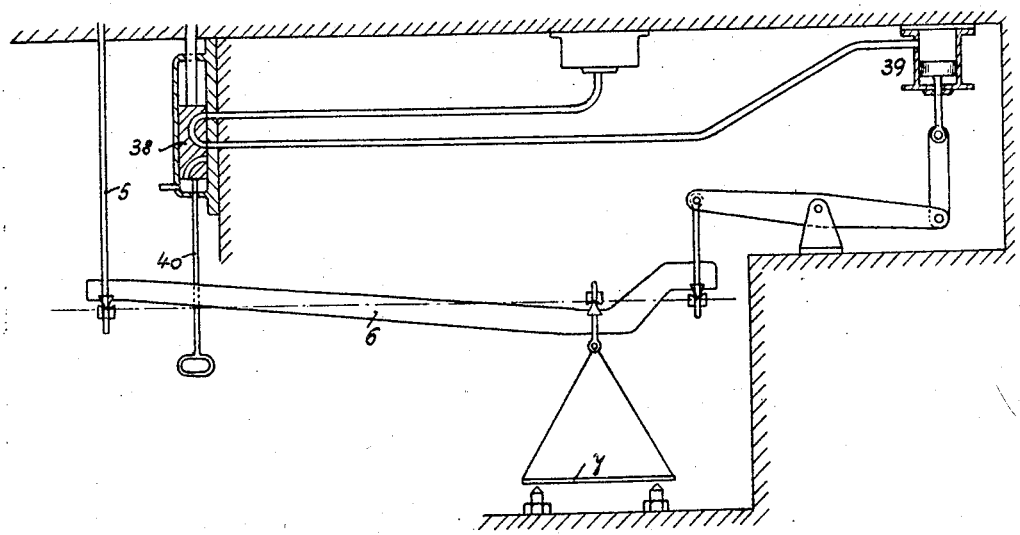

In the construction shown in Fig. 1 the weigh beam is formed by a hollow cylinder 1, which is closed on both ends and provided with an arm 2 mounted in the middle, by which it rests on the bracket 4 of the frame by the aid of the knife-edge 3. At the free end of the arm 2 a rod 5 is attached, which is connected with the scale lever 6, from which the bowl 7 for the goods is suspended. The up- and down-movement of the latter causes an oscillation of the weigh beam 1, which will come at rest in a horizontal position when there is equilibrium between the bowl and the weight or poise. The weight 8 fits in the hollow beam 1 like a piston and is movable in one or the other direction. When moved the weight will cause a rotation of the shaft 9 in one or the other direction passing axially through the centre of the weight and provided with a thread 91 cut at a considerably steep angle, and having at the end projecting through the end wall of the cylinder a hand or pointer 11. The end wall of the cylinder or disk 10 is provided with a scale along which the pointer moves.

The cylinder 1 carries a reservoir 12 of compressed air, which can be introduced into the cylinder 1 on both sides of the weight 8 by the aid of pipes 13, when the valves 14 arranged therein are opened.

The distributing device for the feed of the compressed air into the cylinder to either side of the weight 8 consists of the two valve devices 15 and 16 which are mounted on the cylinder 1 near its ends. These valve devices comprise a relieved double valve 17, Fig. 2, which separates two chambers 151 and 152 from one another, the upper one 151 of which is in communication by a pipe 18 with the cylinder 1, while the lower chamber 152, which is larger than the chamber 151, has an air outlet 20, which can be closed by a spring pressed piston 19, slidable within a small cylinder 191. The spring 21 tends to move the piston 19 upwardly, so as to close the outlet 20. Each piston 19 is connected by a rod 192 with an arm 141 of the valve or cock 14 opening this valve when moved upwardly by the spring 21.

The double seated valve 17 of each valve device 15, 16 is slightly pressed against its seats, and connected with a vertical rod 23, carrying a small valve 24. When the double seated valve 17 is opened the small valve 24 is closed, thus shutting off the chamber 152 against the atmosphere, whereby a stuffing box for the valve rod 23 is avoided. The lower end of the rod 23 carries a block, on which the knife-edge of the lever 25 rests. The longer arm of the lever catches under an abutment 26 fixed to the frame of the machine, while the shorter arm catches under a block attached to a part 27 fixed to the casing of the valve device 15 or 16, respectively.

When the cylinder in the equilibrium state of the scale is in horizontal position, both double valves 17 are closed, and the two levers 25 contact only slightly the blocks of the rods 23. When on oscillation of the cylinder 1 one of the valve devices 15 or 16 moves upwardly, the corresponding lever 25 owing to its contact with the abutment 26 exerts a pull on the rod 23, and thus opens the corresponding double seated valve 17. When one of the valve devices 15 or 16 is lowered the corresponding rod 23 will not be operated by the lever 25, and therefore the corresponding double seated valve 17 will remain closed.

The operation is as follows: When on loading the bowl 7 the cylindrical beam 1 is oscillated, so as to raise the right-hand side, the double seated valve 17 of the valve device 16 will be opened, so that the compressed air of this side of the cylinder 1 will by way of the pipe 18 and the upper chamber 151 pass into the lower chamber 152 of the valve device 16. Thus a pressure will be exerted on the piston 19 from above and moves it downward thereby closing the valve 14 and after a certain space of time opening the outlet 20. Not until then the compressed air within the left end of the cylinder 1 is enabled to drive the weight or piston 8 towards the right to again restore equilibrium, the compressed air having been replaced in the right hand side of the cylinder from the reservoir 12 before the outlet 20 has been opened. The air acting on the weight 8 on the left hand side will also be replaced by air coming from the reservoir 12.

In the modification shown in Fig. 3 in which a common beam 28 is used such as is usual in steelyards having a weight 8 slidable thereon, which is adapted to be shifted along by rack and pinions, the valve devices 15 and 16 are mounted one above the other on a fixed part of the scale frame in such way that the valve rods 23 are placed opposite one another. Intermediate of the two valve devices the levers 25 are arranged opposite one another, and are supported with one end on the fixed part 26. The lower lever 25 bears against the rod 23 of the upper valve device 15 and the upper lever 25 bears against the rod 23 of the lower valve device 16, the rods 23 being joggled correspondingly. The other ends of the levers 25 rest against the free end of the weigh beam 28 in such manner that by the upward oscillation of the beam the double seated valve of the lower valve device will be opened, and on the downward oscillation the double seated valve of the upper valve device is opened. The pipes 18, which are intended to discharge compressed air into the valve devices 15 and 16, are connected with the compressed air cylinder 29, within which a piston 291 is adapted to slide, the piston rod of which is connected with a rack 292. Into the cylinder 29 compressed air will be fed from the reservoir 12 by the aid of pipes 13, in which similar to the construction shown in Fig. 1, there is a valve 14 governed by the valve device 15 or 16 respectively. The operation is similar to that described with reference to Fig. 1.

In the weighing scale according to Fig. 1 a rail 31 is slidably held parallel to the cylinder 1 by arms 30 which are suspended from the cylinder. This slidable rail is normally held in its utmost position to the left by a spring 311, a boss 32 fixed to the rail 31 abutting against the right hand arm 30. In the drawing, Fig. 1, the rail 31 is shown in its position moved towards the right, being provided with lugs 33 one of which being held by a lock bolt 34. A lock bolt 34 is provided on each side and is guided vertically in brackets 301 attached to or integral with the arms 30. These lock bolts 34 are connected with the above named rods 192 by rods 141 on the connection pin of the arm 341. Pivotally connected with a bracket 121 on the reservoir 12 is a bell crank lever 35, the vertical arm of which being connected with the rail 31 by a connecting rod 351. The end of the other or horizontal arm of the lever 35 is connected by a link 352 with a rod 36 guided in a bracket 361 attached to the reservoir 12. The slidable rod 36 is moreover connected with the piston rod 381 of the piston 38 by a link or connecting rod 37. The piston 38 constitutes a distributing valve for the relief device 39 of the scale. In Fig. 1 the distributing valve 38 is shown so adjusted that the scale is in a position of weighing, that is to say, on relief, the rail 31 being moved by the bell crank lever 35 into such position that the lugs 33 are standing to one side of the lock bolts 34.

The connection between the slidable rod 36 and the link 37 and also the connection of the link 37 and the piston rod 381 is preferably arrived at by knife-edges and locks as shown. The vertical centre line of the knife-edge-joint between the rods 36 and 37 must coincide with the vertical centre line of the knife-edge 3 of the cylinder 1, and also must lie at the same height so as to prevent any tendency of rotation, when by hand a pull is exerted on the distributing valve 38, since by such tendency of rotation of the cylinder 1 the latter would be hindered in its oscillation.

When a pull is exerted on the distributing valve 38 by aid of the handle 40 attached to this valve the scale 6, 7 will be brought from the relief position into the weighing position, and at the same time the rail 31 will be drawn towards the right, Fig. 1. Either of the pistons 19 of the valve device 15 or 16 respectively can be moved downwards since they are no more prevented by the lugs 33. When now one of the pistons 19 is moved downwardly the lock bolt 34, belonging to this piston will be moved in front of the corresponding lug 33, and thereby prevents the rail 31 and the distributing valve 38 to return in its former position. Not until equilibrium is again obtained owing to which both pistons 19 will be again in their upper position the rail 31 will no more be locked by any of the bolts 34, and then the rail can return into its former position, owing to the spring 311, and by the aid of the bell crank lever 35 the distributing valve 38 will also return in its former position to relieve the weighing scale 6, 7.

In order to avoid that the opening of the double seated valves 17 causes an abnormal movement of the beam, that is to say causes the cylinder 1 to pass the allowable limit these valves must open even when only a very slight pull is exerted on one of the rods 23. The pressure, that is to enable this operation, should be so slight that only a small part of such power, which would even be allowable by the authorities, is sufficient to lift the valves. For this reason the diameter of the valve is very large and the stroke should be very small, and to prevent the compressed air to exert a pressure on the valve said valves are constructed double seated, and are therefore relieved from pressure. Moreover, to allow only a slight power to cause an operation of the valves, the valve body 17 is made floating by attaching it to horizontal tension wires 41, which are distributed round about the valves radially and connected with their free ends on holders 42 mounted on the valve casing. Even if these wires 41 are spanned very tight the movement of the valves for about $\frac{1}{10}$ mm. requires only extremely small power. The valve springs 22 are of such strength that their pressure is just sufficient to close the valves.

Though the thread 91 on the shaft 9 may be very steep yet it is evident that the shaft will have to make more than one revolution when the weight 8 is shifted. Therefore the scale on the disk 10 is so constructed that the hand or pointer 11 corresponding to the rotation is enabled to point on a prolongation of the circle. Means to enable such an indication is shown in Figs. 4–7.

The disk 10 for the scale is provided on its front with a spiral rib 43 carrying the scale division lines and numbers in consecutive order. The hand 11 is bifurcated and between the shanks of the bifurcation a slide 45 is guided having the pointer proper 44. On the back side of the slide there are mounted lugs 46, which engage the windings of the spiral rib 43. Thus when the hand 11 is rotated the slide 45 will be moved along the spiral rib 43 correspondingly the pointer 44 indicating by its position the weight of the goods.

The weight 8 is in the mode of construction shown in the drawings not rotatably but longitudinally movable within the cylinder 1 by ribs 81 of the weight catching into longitudinal grooves 82 of the cylinder.

I claim:

1. A weighing scale comprising a hollow cylinder to form a weigh beam, a movable weight, a pressure fluid cylinder, the weight being adapted to move along the beam by the aid of compressed fluid, two valve devices communicating with the said cylinder, one adapted to allow fluid to escape from one side of the cylinder when the beam oscillates in one direction and the other adapted to allow fluid to escape from the other side of the cylinder, when the beam oscillates in the other direction, and means to feed the opposite side of the cylinder with compressed fluid to cause movement of the weight until equilibrium is obtained and means to operate the valves on the weigh beam passing through the position of equilibrium.

2. A weighing scale comprising a hollow cylinder to form a weigh beam, a movable weight, a pressure fluid cylinder, means to move the weight along the beam by the aid of compressed fluid, two valve casings, a valve intermediate of each valve casing comprising two chambers, one chamber communicating with one end of the said pressure fluid cylinder, and the other chamber sure fluid cylinder, and the other chamber communicating with an outlet, a spring pressed piston in the outlet normally closing the outlet and adapted to open the outlet by fluid pressure when the corresponding valve is opened, a reservoir for the compressed fluid, pipes connecting the reservoir with the two ends of the cylinder, valves in the said pipes and adapted to be closed when the said outlet is opened by the movement of the corresponding piston and means to operate the valves on the weigh beam passing through the position of equilibrium.

3. A weighing scale comprising a hollow cylinder constructed to form a weigh beam and fulcrumed at its centre a movable piston-like weight within the cylinder a reservoir connected with the cylinder at its ends to allow fluid pressure to act on both sides of the weight, two valve devices communicating with the hollow cylinder, one at each end, one valve device adapted to allow fluid to escape from one end of the cylinder when oscillating in one direction and the other adapted to allow fluid to escape from the other end of the cylinder, when oscillating in the other direction and means to cut off communication between the hollow cylinder and the reservoir at that end of the cylinder from which the fluid is allowed to escape and means to operate the valves on the weigh beam passing through the position of equilibrium.

4. A weighing scale comprising a weigh beam, a pressure fluid cylinder, a movable weight adapted to move along the beam by the aid of compressed fluid, two valve devices communicating with the said cylinder, one adapted to allow fluid to escape from one side of the cylinder when the beam oscillates in one direction and the other adapted to allow fluid to escape from the other side of the cylinder, when the beam oscillates in the other direction, and means to feed the opposite side of the cylinder with compressed fluid to cause movement of the weight until equilibrium is obtained, a lever fulcrumed at one end on a fixed part, and at the other end on the weigh beam, and adapted to open the valve device on the oscillation of the weigh beam and means to operate the valves on the weigh beam passing through the position of equilibrium.

5. A weighing scale comprising a weigh beam, a pressure fluid cylinder, a movable weight adapted to be moved along the beam by the aid of compressed fluid, two valve casings, a chamber within each valve casing communicating with the compressed fluid cylinder, a second chamber in the said casing communicating with an outlet, a spring pressed valve adapted to normally prevent communication between the two chambers, a spring pressed piston in the outlet, normally closing the outlet and adapted to open the outlet by fluid pressure, when the said valve is opened, a valve spindle, a lever fulcrumed at one end to a fixed part and engaged at the other end by the weigh beam and adapted to operate the said valve by engaging the valve spindle on the oscillation of the beam in one direction and to be disengaged therefrom on the oscillation of the beam in the other direction.

6. A weighing scale comprising a hollow cylinder constructed to form a weigh beam and fulcrumed at its centre, a movable piston-like weight within the cylinder, a reservoir connected wih the cylinder at its ends to allow fluid pressure to act on both sides of the weight, two valve devices communicating with the hollow cylinder, one at each end, adapted to be operated on the oscillation of the cylindrical weigh beam and to allow compressed fluid to escape from and to allow such to enter the cylinder to cause the piston-like weight to be shifted until equilibrium is obtained, a spring pressed rail slidably carried by the cylindrical beam, locking lugs on the rail, slidable bolts adapted to be operated by the said valve device, when in a working position to allow compressed fluid to escape from the cylinder, and when thus operated engaging one of the said lugs of the said rail to lock the rail when moved against the action of its spring, a lever connected with the said rail and adapted to be operated by hand to move the rail against the action of its spring.

7. A weighing scale comprising a weigh beam constructed to form a hollow cylinder and fulcrumed at its centre, a movable piston-like weight within the cylinder, means to move the weight by fluid pressure, when the weigh beam oscillates, a rail slidably carried by the weigh beam and adapted to be locked in position when the weigh beam oscillates from the horizontal position in one or the other direction, a relief device in connection with the scale adapted to hold the scale in inoperative position, means to operate the relief device and connected with the said rail so as to move the rail into locking position when relieving the scale.

8. A weighing beam comprising a weigh beam, a movable weight, a pressure fluid cylinder, means to move the weight along the beam by the aid of compressed fluid, two valve casings, two chambers within each valve casing, a valve intermediate of the two chambers one chamber communicating with one end of the said pressure fluid cylinder, and the other chamber communicating with an outlet, a spring pressed piston in the outlet normally closing the outlet and adapted to open the outlet by fluid pressure when the corresponding valve is opened, a reservoir for the compressed fluid, pipes connecting the reservoir with the two ends of the cylinder, valves in the said pipes and adapted to be closed, when the said outlet is opened by the movement of the corresponding piston, the said valve suspended by radial spanning wires, one end of the wires being fastened to the valve and the other end to the valve casing and a spring adapted to normally close the said valve.

9. A weighing scale comprising a hollow cylinder, constructed to form a weigh beam and fulcrumed at its centre, a movable piston-like weight within the cylinder, a reservoir connected with the cylinder at its ends to allow fluid pressure to act on both sides of the weight, two valve devices communicating with the hollow cylinder, one at each end, adapted to be operated on the oscillation of the cylindrical weigh beam and to allow compressed fluid to escape from and to allow such to enter the cylinder to cause the piston-like weight to be shifted until equilibrium is obtained, a shaft journaled with the hollow cylinder and passing through the piston-like weight, an outer helical steep screw thread on the said shaft and a corresponding internal screw thread on the weight, an indicating hand on the end of the shaft, projecting out through the end wall of the cylinder and scale division lines on the outside of the said end wall.

10. A weighing scale comprising a hollow cylinder, constructed to form a weigh beam and fulcrumed at its centre, a movable piston-like weight within the cylinder, a reservoir connected with the cylinder at its ends to allow fluid pressure to act on both sides of the weight, two valve devices communicating with the hollow cylinder, one at each end, adapted to be operated on the oscillation of the cylindrical weigh beam and to allow compressed fluid to escape from and to allow such to enter the cylinder to cause the piston-like weight to be shifted until equilibrium is obtained, a shaft journaled with the hollow cylinder and passing through the piston-like weight, an outer helical steep screw thread on the said shaft and a corresponding internal screw thread on the weight, an indicating hand on the end of the shaft projecting out through the end wall of the cylinder, a spiral rib on this end wall carrying scale division lines, a slidable pointer on the indicating hand, adapted to be guided by the spiral rib.

In testimony whereof I have signed my name to this specification.

FRIEDRICH AUGUST ALBERT ESSMANN.